United States Patent
Schulz et al.

(10) Patent No.: US 10,697,877 B2
(45) Date of Patent: Jun. 30, 2020

(54) METHOD FOR ASCERTAINING A VISCOSITY OF A FUEL

(71) Applicant: Robert Bosch GmbH, Stuttgart (DE)

(72) Inventors: Udo Schulz, Vaihingen/Enz (DE);
Achim Jenne, Oberaichen (DE);
Florian Schmitt, Winnenden (DE);
Henning Hermes, Wolfach (DE);
Tobias Friedl, Filderstadt (DE); Ulf Mueller, Schwieberdingen (DE); Ulrich Foerch, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 237 days.

(21) Appl. No.: 15/774,044

(22) PCT Filed: Nov. 17, 2016

(86) PCT No.: PCT/EP2016/077969
§ 371 (c)(1),
(2) Date: May 7, 2018

(87) PCT Pub. No.: WO2017/093031
PCT Pub. Date: Jun. 8, 2017

(65) Prior Publication Data
US 2018/0328828 A1    Nov. 15, 2018

(30) Foreign Application Priority Data
Dec. 1, 2015  (DE) .......... 10 2015 223 848

(51) Int. Cl.
*G01N 11/04* (2006.01)
*F02M 37/00* (2006.01)
(Continued)

(52) U.S. Cl.
CPC ......... *G01N 11/04* (2013.01); *F02D 41/3082* (2013.01); *F02M 37/0052* (2013.01);
(Continued)

(58) Field of Classification Search
CPC .............. G01N 11/00–08; F02D 41/30; F02D 41/3082; F02D 41/38; F02D 41/3854;
(Continued)

(56) References Cited

U.S. PATENT DOCUMENTS 5,423,302 A * 6/1995 Glassey ............... F02M 57/025
123/381
5,706,780 A * 1/1998 Shirakawa ............ F02D 41/005
123/381
(Continued)

FOREIGN PATENT DOCUMENTS

| DE | 10154133 C1 | 2/2003 |
|---|---|---|
| DE | 102010038840 A1 | 3/2012 |
| DE | 102013204369 A1 | 9/2014 |
| DE | 102014201206 A1 | 7/2015 |

(Continued)

OTHER PUBLICATIONS

International Search Report dated Feb. 14, 2017, of the corresponding International Application PCT/EP2016/077969 filed Nov. 17, 2016.

*Primary Examiner* — Nguyen Q. Ha
(74) *Attorney, Agent, or Firm* — Norton Rose Fulbright US LLP; Gerard Messina

(57) ABSTRACT

A method for ascertaining a viscosity of a fuel with the aid of an electric fuel pump which is integrated into a fuel circuit including an overflow valve which includes a permanently open discharge channel, a fuel supply and delivery being adjusted with the aid of the electric fuel pump in the fuel circuit at a specific pressure and the viscosity of the fuel being ascertained by taking into account a delivery rate of the electric fuel pump.

11 Claims, 2 Drawing Sheets

(51) Int. Cl.
  *F02D 41/30* (2006.01)
  *F02M 37/08* (2006.01)
  *F02M 37/22* (2019.01)
  *F02D 41/38* (2006.01)

(52) U.S. Cl.
  CPC ............ *F02M 37/08* (2013.01); *F02M 37/22* (2013.01); *F02D 41/3854* (2013.01); *F02D 2200/0604* (2013.01); *F02D 2200/0606* (2013.01); *F02D 2200/0608* (2013.01); *F02D 2200/0612* (2013.01)

(58) Field of Classification Search
  CPC .. F02D 2200/0604–0612; F02M 37/00; F02M 37/0052; F02M 37/08; F02M 37/22
  See application file for complete search history.

(56) References Cited

U.S. PATENT DOCUMENTS

| | | | | |
|---|---|---|---|---|
| 6,216,528 | B1* | 4/2001 | Carrell | F02M 57/025 73/54.01 |
| 7,762,080 | B2* | 7/2010 | Anson | F02C 9/30 417/44.11 |
| 2004/0000288 | A1* | 1/2004 | Puckett | F02D 41/32 123/446 |
| 2008/0156295 | A1* | 7/2008 | Suzuki | F02M 37/0041 123/447 |
| 2013/0226438 | A1* | 8/2013 | Schroeder | F02D 41/0025 701/104 |

FOREIGN PATENT DOCUMENTS

| | | |
|---|---|---|
| EP | 2090766 A2 | 8/2009 |
| JP | S6468659 A | 3/1989 |
| JP | 3677590 B2 | 8/2005 |

* cited by examiner

METHOD FOR ASCERTAINING A VISCOSITY OF A FUEL

FIELD

The present invention relates to a method for ascertaining a viscosity of a fuel as well as a processing unit and a computer program for carrying out same.

BACKGROUND INFORMATION

In motor vehicles including internal combustion engines, a viscosity of the utilized fuel may have wide-reaching consequences for the internal combustion engine. This applies in particular to diesel and diesel engines.

For example, the viscosity may have an effect on a combustion of the fuel in the internal combustion engine or be relevant to a required predefined volume flow rate when metering fuel.

A method for detecting a change in a viscosity of a fuel is, for example, described in German Patent Application No. DE 10 2010 038 840 A1. In this case, jumps in the profile of an operating current of an electric fuel pump are ascertained which are based on a change in the delivery volume due to a change in the viscosity.

SUMMARY

According to the present invention, a method for ascertaining a viscosity of a fuel as well as a processing unit and a computer program for carrying out the same are provided. Advantageous example embodiments are described herein.

An example method according to the present invention is used to ascertain a viscosity of a fuel with the aid of an electric fuel pump which is integrated into a fuel circuit, in particular a low-pressure fuel circuit, including an overflow valve which includes a permanently open discharge channel. Here, fuel supply and delivery are adjusted with the aid of the electric fuel pump in the fuel circuit at a specific pressure (i.e., differential pressure between the inlet and the outlet) and the viscosity of the fuel is ascertained by taking into account a delivery rate of the electric fuel pump.

An overflow valve is provided in a low-pressure fuel circuit of a motor vehicle for the purpose of delimiting the pressure in the low-pressure fuel circuit. For this purpose, the overflow valve includes a preset and known opening pressure (i.e., differential pressure between inlet and outlet) at which the overflow valve opens. For this purpose, the overflow valve may include a pressure relief valve, in particular, where a high-pressure fuel circuit, which is connected to the low-pressure fuel circuit, is not supposed to or does not have to be fed by the low-pressure fuel circuit, for example because the internal combustion engine is not in operation and the pressure in the low-pressure fuel circuit would otherwise rise excessively. In addition, such an overflow valve usually includes a discharge channel, which is also open during normal operation, so that a minor volume flow is directed past the high-pressure fuel circuit for cooling the components involved, for example.

If a specific pressure is now adjusted in the fuel circuit, which is in particular below the opening pressure (i.e. differential pressure between inlet and outlet) of the overflow valve, and if the fuel flows through the discharge channel of the overflow valve, the volume flow rate through the discharge channel corresponds to the delivery rate of the fuel pump. This delivery rate results from the rotational speed of the fuel pump and the geometric delivery volume per rotation. While the geometric delivery volume for a fuel pump is usually known or determinable, the rotational speed may be ascertained with the aid of a pump control unit, for example, which is present in any case. Now, the volume flow in the discharge channel correlates in the first approximation, i.e., a laminar flow which is sufficiently accurate in the present case, according to the so-called Hagen-Poiseuille law with the radius or the diameter and the length of the discharge channel, the pressure difference upstream and downstream from the discharge channel as well as the viscosity. For a more detailed description, reference is made to the description of the figures.

Using same, an absolute ascertainment or computation of the viscosity may take place if the geometric dimensions and the pressure difference are known. If the geometric dimensions and the pressure difference are not known, a relative ascertainment or computation of the viscosity may still take place by comparing for example two measurements to one another. The viscosity may now be made available for other applications. For example, a more accurately predefined volume flow rate or a more accurate metering of the fuel may thus take place. Furthermore, a differentiation may be made between summer and winter diesel which have markedly different viscosities. It may likewise be detected, for example, if the motor vehicle is filled with the wrong type of fuel, i.e., gasoline instead of diesel, for example.

The specific pressure preferably corresponds to a pressure at which a pressure relief valve of the overflow valve is barely closed. As already mentioned, the overflow valve opens at a known opening pressure. If the pressure in the fuel circuit is now adjusted to a value below this opening pressure, this opening pressure may be used as the reference pressure. This provides a simple possibility of adjusting a specific and known pressure value. It is understood that the more accurately this reference pressure corresponds to the actual pressure, the closer the pressure is advanced toward the opening pressure. This may take place, for example, in that the pressure is scaled back minimally when the overflow valve opens. Here, an opening of the overflow valve may be detected in that the volume flow rate considerably increases.

A fuel filter is advantageously situated in the fuel circuit between the electric fuel pump and the overflow valve. The fuel filter is used to generate a counterpressure in the fuel circuit, whereby the specific pressure may be easily achieved in the fuel circuit. Such a fuel filter is oftentimes already present in a suitable position in the fuel circuit.

It is advantageous if the fuel supply and delivery is adjusted at the specific pressure, while no fuel is delivered via the fuel circuit to another fuel circuit connected thereto and/or while an internal combustion engine which is supplied at least indirectly via the fuel circuit, in particular via the other fuel circuit, is not in operation. In this way, it may be ensured that the fuel supply and delivery only takes place via the discharge channel of the overflow valve.

When ascertaining the viscosity of the fuel, geometric dimensions of the discharge channel of the overflow valve and a pressure difference upstream and downstream from the discharge channel are preferably taken into account. This allows for an absolute or quantitative ascertainment of the viscosity. The geometric dimensions of the discharge channel are values which are typical for the overflow valve. In general, the pressure difference may also be assumed to be constant. In addition, the geometric dimension and the pressure difference may also be ascertained through comparative measurements using fuel (or a different fluid) of known viscosity.

When ascertaining the viscosity of the fuel, a reference value for a viscosity of a fuel is advantageously taken into account. This may for example involve the viscosity of a standardized fuel (cf. for example DIN EN 590).

It is advantageous when a leakage of the fuel circuit is taken into account as an enlargement of a cross section of the discharge channel. This makes it possible to take into account a potential leakage in the fuel circuit with particularly little effort when ascertaining the viscosity.

Furthermore, a temperature of the fuel is preferably ascertained and taken into account when ascertaining the viscosity of the fuel. Since the viscosity of the fuel significantly depends on its temperature, a simpler and better ascertainment of the viscosity may take place by taking the temperature into account. In addition, this makes it easier to differentiate between summer and winter diesel.

Advantageously, the ascertained viscosity is checked for plausibility. This may take place, for example, by comparing the values which were ascertained based on the geometric dimensions of the discharge channel to the reference viscosity values.

Likewise, it is possible to compare multiple similar measurements to one another in order to detect potential error-induced deviations. The reliability of the ascertained viscosity value is thus increased.

A processing unit according to the present invention, e.g., a control unit of a motor vehicle, is configured to carry out a method according to the present invention, in particular from a programming point of view. Such a control unit may be in particular a pump control unit of the fuel pump or an engine control unit which is usually superordinate to the pump control unit and is connected thereto for the purpose of data exchange.

It is also advantageous to implement the method in the form of a computer program, since this is particularly cost-effective, in particular when an executing control unit is used for other tasks and is thus present anyway. Suitable data carriers for providing the computer program are, in particular, magnetic, optical, and electrical memories such as hard drives, flash memories, EEPROMs, DVDs, and many others. It is also possible to download a program via computer networks (Internet, Intranet, etc.).

Further advantages and embodiments of the present invention result from the description and the figures.

The present invention is schematically illustrated in the figures on the basis of one exemplary embodiment and is described below with reference to the figures.

DETAILED DESCRIPTION OF EXAMPLE EMBODIMENTS

Figure 1:
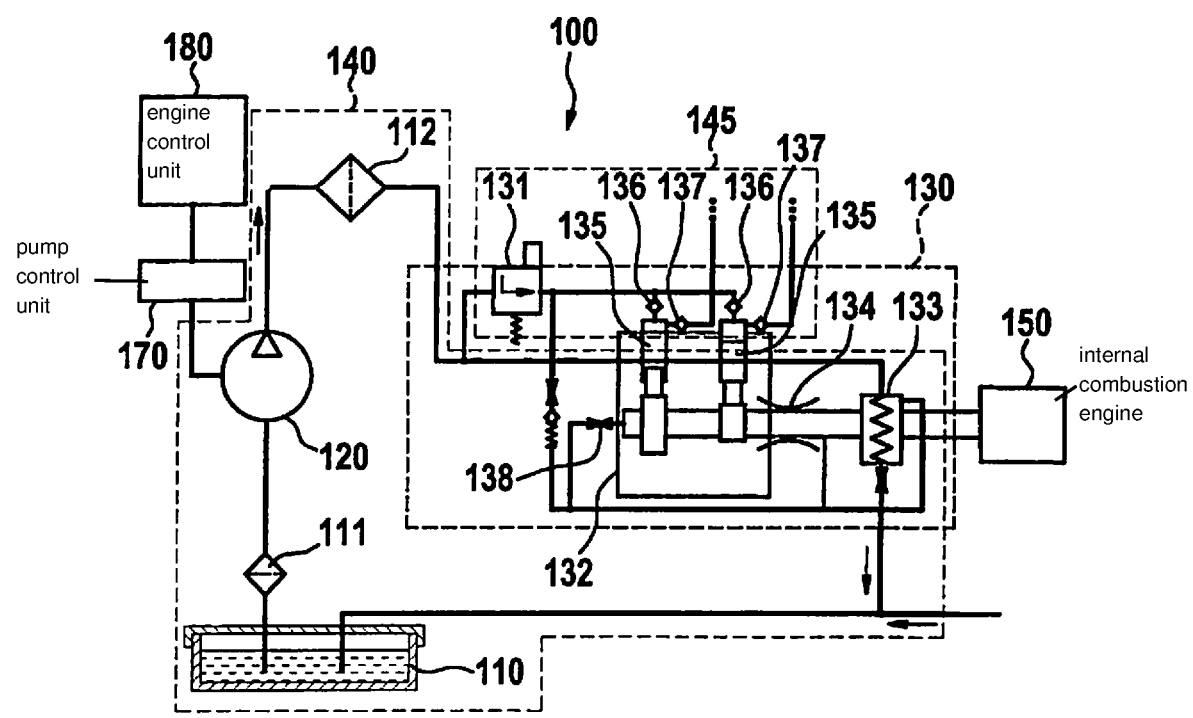
FIG. 1 schematically shows a part of a fuel supply system including an electric fuel pump and an overflow valve with the aid of which a method according to the present invention may be carried out.

FIG. 1 shows schematically and by way of example a part of a fuel supply system 100 of an internal combustion engine of a motor vehicle including an electric fuel pump 120 and an overflow valve 133 with the aid of which a method according to the present invention may be carried out. In this case, fuel is delivered from a fuel tank 110 with the aid of fuel pump 120 to a high-pressure pump 130 via two filters 111 and 112.

In high-pressure pump 130, encompassed by an additional fuel circuit designed as a high-pressure fuel circuit 145, fuel is fed via a quantity adjuster 131 and two inlet valves 136 into two pistons 135 which are situated in an engine compartment 132. Both pistons 135 are coupled to internal combustion engine 150 and are driven via same. The fuel may be fed to a high-pressure accumulator (not illustrated in the present case), for example, via outlet valves 137.

Overflow valve 133 is illustrated as well as, by way of example, two bearing leakages 134 and 138 via which fuel flows back into fuel tank 110. Fuel may permanently flow via overflow valve 133 through a small discharge channel at a low volume flow rate, for example to cool high-pressure pump 130, or, in the open state, at a high volume flow rate.

Fuel pump 120 is, in the present case, a pre-feed pump which is operated with the aid of an electric motor and which is located in a low-pressure fuel circuit 140 of fuel supply system 100. Low-pressure fuel circuit 140 includes, in this case, fuel tank 110, filters 111, 112, fuel pump 120 as well as overflow valve 133. For the sake of completeness, it is pointed out that low-pressure fuel circuit 140 may also run through the housing of high-pressure pump 130 for cooling same, for example. Fuel pump 120 may be an electrically operated gear pump, for example.

Fuel pump 120 is assigned a pump control unit 170 which is provided for controlling and/or regulating fuel pump 120 and includes corresponding equipment, such as a microcontroller, measuring technology, and a suitable software. With the aid of the measuring technology, it is in particular possible to detect a current which is being applied or flowing during the operation of fuel pump 120.

Furthermore, an engine control unit 180 is provided to which pump control unit 170 is connected in a data-transmitting manner. For the purpose of controlling the internal combustion engine, which is supplied with fuel via fuel supply system 100, engine control unit 180 issues corresponding commands, such as a rotational speed or a volume flow rate, to pump control unit 170 so that fuel pump 120 is controlled in a desirable manner.

Figure 2:
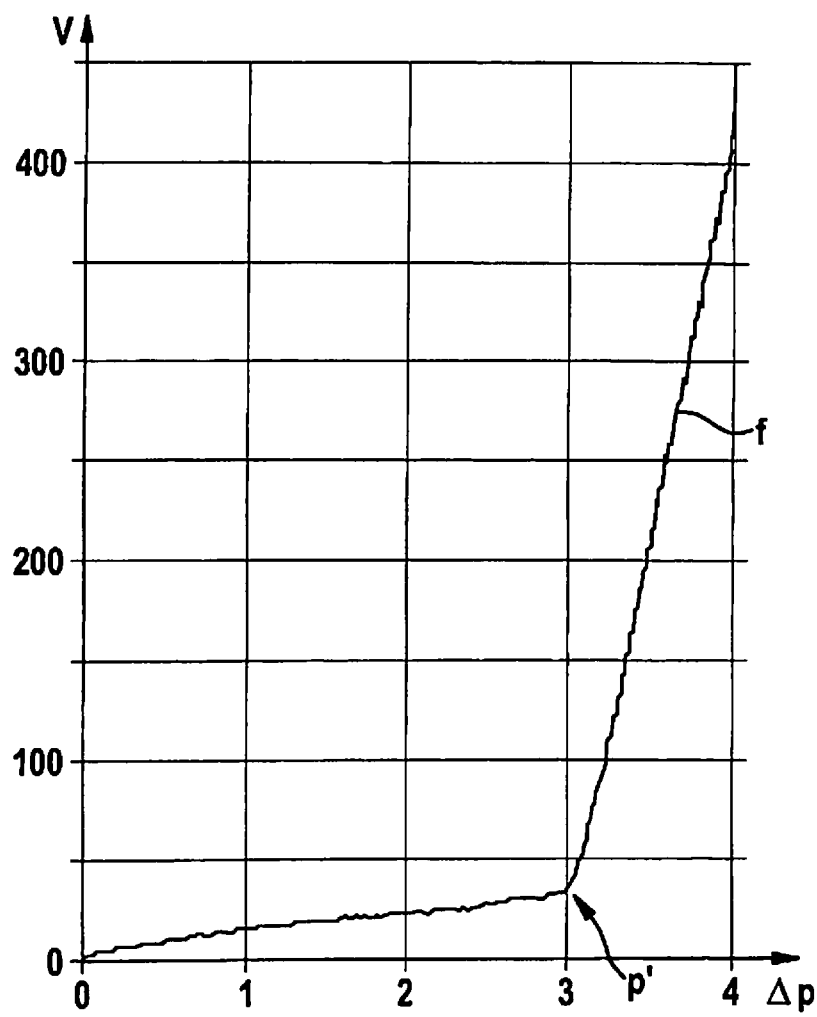
FIG. 2 shows a volume flow rate/pressure profile which is typical for an overflow valve.

FIG. 2 shows by way of example a volume flow rate/pressure profile f which is typical for an overflow valve. In this case, volume flow rate $\dot{V}$ is plotted in l/h (liters per hour) against a pressure difference $\Delta p$ in bar. The pressure difference corresponds to a pressure difference of the pressures upstream and downstream from the overflow valve.

It is apparent in profile f that its gradient is initially low, approximately 20 l/(h·bar), and starting from a pressure p'≈3 bar, which corresponds to the opening pressure of the overflow valve, it is significantly higher, approximately 400 l/(h·bar). An overflow valve has a profile of this type or a similar one which is generally also known.

The part of profile f prior to opening pressure p' is determined by volume flow rate $\dot{V}$ through the discharge channel of the overflow valve. Volume flow rate $\dot{V}$ is yielded according to the so-called Hagen-Poiseuille law from the geometric data of the discharge channel according to the equation:

$$\dot{V} = \frac{\pi R^4 \Delta p}{8 \eta l}$$

Here, R identifies the radius and l the length of the discharge channel (the radius is assumed to be constant in this case). Δp identifies the pressure difference between the pressure upstream from the discharge channel and the pressure downstream from the discharge channel. Here, Δp essentially corresponds to the pressure upstream from the discharge channel, such as the pressure generated by the fuel pump, since downstream from the discharge channel the fuel flows without further counterpressure into the fuel tank. η identifies the viscosity of the fuel. Here, the flow into the discharge channel is assumed to be laminar in a first approximation, which is sufficient for the present method.

Figure 3:
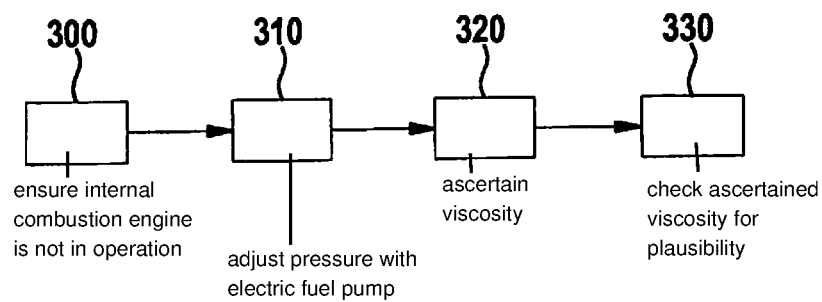
FIG. 3 schematically shows in a block diagram a sequence of a method according to the present invention in one preferred specific embodiment.

FIG. 3 shows in a block diagram a sequence of a method according to the present invention in one preferred specific embodiment.

For this purpose, it may initially be ensured in a step 300 that the internal combustion engine is not in operation and thus no fuel is delivered from the low-pressure fuel circuit to the high-pressure fuel circuit.

In a step 310, a pressure which is preferably just below opening pressure p' of the overflow valve may now be adjusted with the aid of the electric fuel pump in the low-pressure fuel circuit. For this purpose, the fuel pump may be controlled or regulated in a suitable manner with the aid of the pump control unit assigned to it. An opening of the overflow valve may, for example, be detected in that the volume flow rate suddenly considerably increases, as is apparent from FIG. 2. This may then be addressed accordingly.

In a step 320, the above equation for the volume flow rate may then be used to ascertain or compute the viscosity according to the equation $$\eta = \frac{\pi R^4 \Delta p}{8 \dot{V} l}$$

if radius R and length l of the discharge channel are known. Pressure difference Δp may be equated with opening pressure p' of the overflow valve and is therefore known. Volume flow rate V˙ remains the same in the entire fuel circuit and therefore corresponds to the delivery rate which is made available by the fuel pump. This flow may be easily ascertained from the rotational speed and the geometric delivery volume per rotation of the fuel pump.

In the event that the geometric dimensions were to be unknown, a comparative measurement using a known viscosity may, for example, be referred to, as already mentioned. A relative ascertainment of the viscosity, i.e. a difference between two measurements, is possible without knowing the geometric dimensions.

In a step 330, the obtained value for the viscosity may now be checked for plausibility. For this purpose, multiple measurements may be compared against one another, for example. It is likewise possible to ascertain a temperature of the fuel, for example, which is used for the plausibility check.

What is claimed is:

1. A method for ascertaining a viscosity of a fuel with the aid of an electric fuel pump which is integrated into a fuel circuit including an overflow valve which includes a permanently open discharge channel, the method comprising:
adjusting a fuel supply and delivery with the aid of the electric fuel pump in the fuel circuit at a specific pressure; and
ascertaining the viscosity of the fuel being ascertained by taking into account a delivery rate of the electric fuel pump.

2. The method as recited in claim 1, wherein the specific pressure corresponds to a pressure at which a pressure relief valve of the overflow valve is just closed.

3. The method as recited in claim 1, wherein a fuel filter is situated in the fuel circuit between the electric fuel pump and the overflow valve.

4. The method as recited in claim 1, wherein the fuel supply and delivery is adjusted at the specific pressure, at least one of: (i) while no fuel is delivered via the fuel circuit to another fuel circuit connected thereto, and (ii) while an internal combustion engine which is supplied at least indirectly via the fuel circuit via the other fuel circuit, is not in operation.

5. The method as recited in claim 1, wherein when ascertaining the viscosity of the fuel, geometric dimensions of the discharge channel of the overflow valve and a pressure difference upstream and downstream from the discharge channel are taken into account.

6. The method as recited in claim 1, wherein when ascertaining the viscosity of the fuel, a reference value for a viscosity of a fuel is taken into account.

7. The method as recited in claim 1, wherein a leakage of the fuel circuit is taken into account as an enlargement of a cross section of the discharge channel.

8. The method as recited in claim 1, wherein a temperature of the fuel is ascertained and taken into account when ascertaining the viscosity of the fuel.

9. The method as recited in claim 1, wherein the ascertained viscosity is checked for plausibility.

10. A processing unit which is configured to ascertain a viscosity of a fuel with the aid of an electric fuel pump which is integrated into a fuel circuit including an overflow valve which includes a permanently open discharge channel, the processing unit configured to:
adjust a fuel supply and delivery with the aid of the electric fuel pump in the fuel circuit at a specific pressure; and
ascertain the viscosity of the fuel being ascertained by taking into account a delivery rate of the electric fuel pump.

11. A non-transitory machine-readable memory medium on which is stored a computer program for ascertaining a viscosity of a fuel with the aid of an electric fuel pump which is integrated into a fuel circuit including an overflow valve which includes a permanently open discharge channel, the computer program, when executed by a processing unit, causing the processing unit to perform:
adjusting a fuel supply and delivery with the aid of the electric fuel pump in the fuel circuit at a specific pressure; and
ascertaining the viscosity of the fuel being ascertained by taking into account a delivery rate of the electric fuel pump.

* * * * *